April 2, 1935. A. W. HAYDON 1,996,375
ELECTRIC MOTOR
Original Filed Aug. 9, 1933 2 Sheets-Sheet 1

INVENTOR
Arthur Williams Haydon
BY
Pennie Davis Marvin & Edmonds
ATTORNEYS

April 2, 1935.  A. W. HAYDON  1,996,375
ELECTRIC MOTOR
Original Filed Aug. 9, 1933  2 Sheets-Sheet 2

INVENTOR
Arthur William Haydon
BY
Pennie Davis Marvin & Edmonds
ATTORNEYS

Patented Apr. 2, 1935

1,996,375

UNITED STATES PATENT OFFICE 1,996,375

ELECTRIC MOTOR

Arthur William Haydon, Waterbury, Conn.

Continuation of application Serial No. 684,363, August 9, 1933. This application October 15, 1934, Serial No. 748,315. In Canada June 25, 1934

10 Claims. (Cl. 172—278)

This invention relates to electric motors and particularly to single phase motors of the type suitable for operating clock mechanisms and other timing devices. This application is a continuation of my application, Serial Number 684,363, filed August 9, 1933 and on which Patent No. 1,977,184 will issue on October 16, 1934. The invention described and claimed in my application, Serial Number 684,363 relates primarily to single phase motors in which means are provided for forming a stationary axis alternating magnetic field and also a rotating axis magnetic field, the construction and arrangement of the several parts being preferably such that the ratio of the angular space relation of adjacent field poles to the time phase relation of the magnetic flux in these poles, for a given portion of the motor field structure, is different from the corresponding ratio for another portion of this field structure. This provides in a unitary motor structure certain valuable characteristics in that the motor may be said to have two speed ratios each determined by the space and time phase relation existing in separate portions of the field structure. Such a motor may have a relatively low constant synchronous speed, and a high starting torque produced primarily by that portion of the field structure having a speed ratio commensurate with a much higher synchronous speed.

There are certain novel features of the motor structure disclosed in my prior application, Serial Number 684,363 which are valuable regardless of whether they are incorporated in a motor having the features specified in the claims of that application. For example, the present invention relates to improvements which are of great utility regardless of whether they are incorporated in a motor having a field structure providing multiple speed ratios.

One of the objects of the present invention is to provide a motor having a single phase magnetizing winding and two sets of polar projections only one of which is provided with means for causing the flux in some of its polar projections to lag behind the flux in the other polar projections thereof, and all of the polar projections are in alignment, preferably in circumferential alignment with one set of polar projections located in the spaces between the polar projections of the other set. This arrangement of the pole pieces in alignment with each other is advantageous for its provides an efficient field pole structure capable of cooperating with a rotor element of small dimensions and the arrangements of the pole pieces is such that they can be mounted in close proximity to each other, thereby producing sufficient leakage flux to limit the value of the magnetizing current in the magnetizing winding to a desirable low value. This makes it unnecessary to employ an excessive number of turns of wire in the field winding, or some other expedient for limiting the current supplied to the motor field winding. The use of shading means on a portion of only one set of the polar projections deriving their flux from one end of the field winding makes it possible to obtain a rotating magnetic field effect in a structure having very small dimensions. Motors of the type here under consideration are suitable for use in small electric clocks and timing devices of all kinds and in many such applications the space limitations are very exacting, hence the necessity of providing a motor having very small over-all dimensions. An object of my invention is to provide such a motor and, in general, this object is attained by utilizing shading means on only one set of the polar projections, by arranging the pole pieces in alignment with each other and providing a rotor of compact proportions, the rotor being arranged to coact with the field poles to produce the desired torque. I prefer to employ a rotor having uniform reluctance in all directions and if the motor is to operate at a constant synchronous speed the rotor is made of hardened steel or any other material having high hysteresis. The rotor is preferably so constructed and arranged that it embraces and rotates around the assembly of aligned field polar projections.

My invention may employ a single magnetizing coil or field winding wound on a central core of magnetizable material and one set of field poles may be arranged to derive flux from one end of this core and the other set of field poles may be arranged to derive flux from the other end of the core. Each set of poles may consist of polar projections integral or otherwise in magnetic circuit with magnetizable plates or disks which may be mounted on the ends of the central core around which the field winding may be located.

The various objects and advantages of this invention will be apparent upon considering the following detailed description of certain illustrative embodiments of my invention shown in the accompanying drawings in which Fig. 1 is an elevation of an electric motor embodying my invention;

Figure 1:
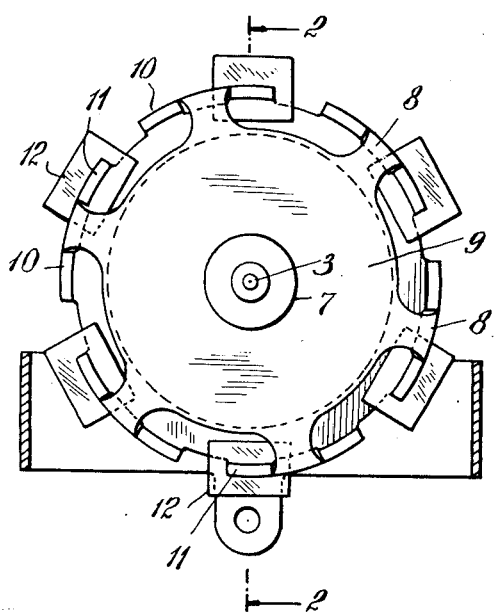
Figure 2:
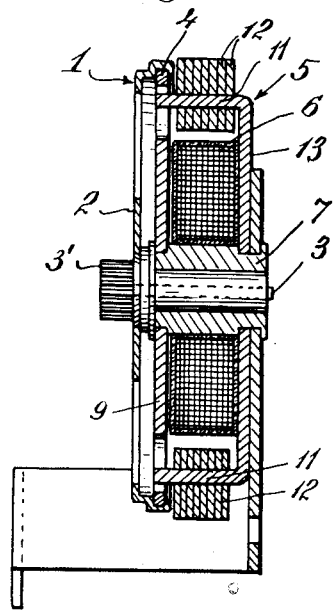
Fig. 2 is a vertical section view of the motor shown in Fig. 1, taken on line 2—2 of Fig. 1.

The motor illustrated in Figs. 1 and 2 of the drawings comprises one embodiment of my invention in which the rotor 1 of the motor consists of a spider 2, preferably made of aluminum or other light-weight material, mounted on a shaft 3 and carrying a rotor element 4 of magnet material. This rotor element 4 may be in the form of a continuous ring of hardened steel, or other metal having high hysteresis. The term "magnet material" is herein used to define such material which has high hysteresis and is therefore capable of retaining considerable residual magnetism.

The field structure 5 of the motor illustrated in Figs. 1 and 2 comprises a single phase field winding 6 surrounding a core 7 of magnetizable material such as soft iron. This core element 7 may be provided with bearings for supporting the shaft 3 of the rotor 1.

The field structure of the motor illustrated in Figs. 1 and 2 comprises two sets of polar projections. One set of these projections are illustrated at 8 in the drawings and constitute polar projections adapted to derive flux from the front end of the core 7, by virtue of the fact that these polar projections 8 are carried by a disk-shaped member 9 of magnetizable material which may be mounted on the front end of the core 7. The other set of pole pieces is illustrated in Figs. 1 and 2 by the reference numerals 10 and 11, the polar projections 10 being unshaded and the polar projections 11 being provided with shading means for causing the flux in these pole pieces to lag behind the flux in the pole pieces 10. The shading means consists of rings 12 of copper, or the like, which are threaded onto the polar projections 11. It will be noted that the polar projections 10 and 11 derive magnetic flux from the rear end of the magnetizing coil 6, for these polar projections are magnetically connected to the rear end of the central core 7 by virtue of the fact that they are carried by a rear plate 13 of magnetizable material. The polar projections 10 and 11 are preferably integral with the rear plate 13.

The two sets of polar projections shown in Figs. 1 and 2 are all disposed in circumferential alignment with the polar projections of one set interspersed between the polar projections of the other set. The two sets of polar projections provide a composite magnetic field represented by magnetic poles located in a plane at one side of the magnetizing coil. The arrangement is preferably such that the rotor element 4 embraces and rotates around the magnetic poles of the field structure as clearly shown in Fig. 2. The magnetic poles are all located in a narrow zone or plane in close proximity to the rotor element 4 which is therefore in efficient operating relation to the field structure. The diameter of the rotor element is relatively large, thus insuring a maximum torque for a given magnetic field strength.

It will be noted that the shading rings 12 are located on a portion of only one set of the polar projections, the set which derives its flux from the rear end of the field winding 6. These shaded poles produce what may be regarded as a rotating magnetic field acting on the rotor at all speeds and this field may be relied upon to provide the motor with adequate starting torque. If the rotor element 4 is of magnet material the hysteresis effect is such that at speeds higher than one-third synchronous speed a sustained positive torque is developed in the rotor by virtue of the two sets of unshaded poles, this torque being in addition to the torque due to the reaction between the rotor and the rotating magnetic field. The speed of the rotor rapidly increases until synchronous speed is reached and then it continues to operate at this constant speed.

The arrangement of the two sets of pole pieces in alignment with each other is advantageous for it not only insures efficient cooperation between the rotor and the stator poles but it facilitates the provision of low reluctance paths for the leakage flux between adjacent poles. To this end the pole pieces may be disposed in close proximity to each other, in fact in some instances it may be desirable to have some pairs of adjacent poles substantially in contact with each other. This produces a choking action limiting the current flowing in the field winding and this makes it possible to use a smaller number of turns of wire in the field winding than would ordinarily be necessary for a given impressed voltage.

In Figs. 1 and 2 it will be noted that the polar projections 8 are uniformly spaced from each other around the field structure and this is also true of the other set of polar projections 10 and 11. Each set of polar projections provides the same number of unshaded poles but it will be noted that the set of polar projections which includes the polar projections 10 also includes additional polar projections 11 each of which is provided with a number of conducting rings 12 of copper, or the like, whereby the flux in these projections lags behind the flux in the unshaded poles 10.

Figure 3:
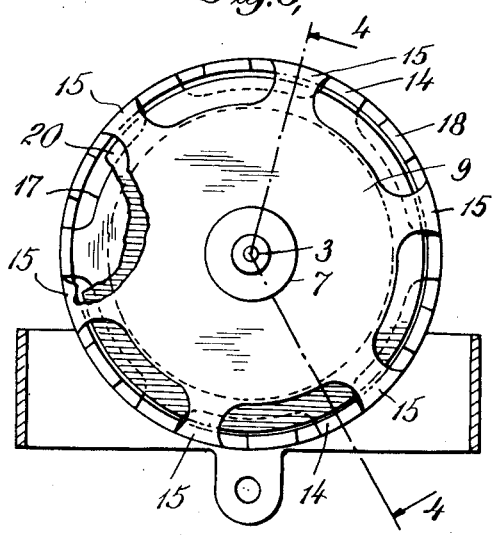
Fig. 3 is an elevation of an electric motor representing another embodiment of my invention.
Figure 4:
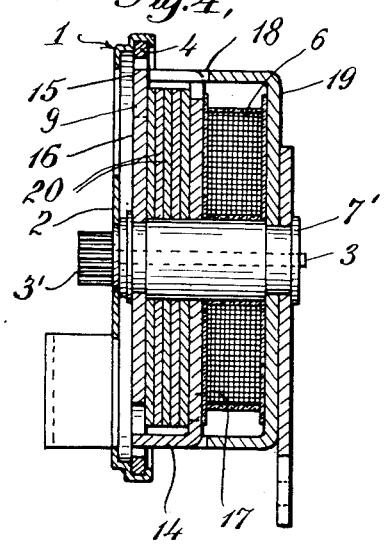
Fig. 4 is a vertical section view of the motor shown in section 3, taken on line 4—4 of Fig. 3.

The motor illustrated in Figs. 3 and 4 is similar to that shown in Figs. 1 and 2 except that one set of polar projections, the set deriving its flux from the front end of the core 7', comprises polar projections 15 carried by one disk or plate of magnetizable material 16 mounted on the front end of the core 7' and a series of polar projections 14 carried by a second plate 17 mounted on the core 7', both of these plates 16 and 17 being located at the front end of the field winding whereby the two groups of polar projections 14 and 15 derive flux from the front end of the field winding. The other set of polar projections 18 are carried by a plate 19 mounted on the rear of the core 7'. The disks 16 and 17 are separated by a number of lag plates 20 of copper, or the like, which cause the flux in the pole pieces 15 to lag behind the flux in the pole pieces 14, thus providing a rotating field for imparting starting torque to the motor. The rotor 1 of the motor illustrated in Figs. 3 and 4 is of the same construction as the rotor 1 of the motor illustrated in Figs. 1 and 2. In both instances the rotor includes a rotor element 4 in the form of a ring having uniform reluctance in all directions and this ring is carried by a spider 2 mounted on a shaft 3. The shaft in each instance may carry a pinion 3' which may drive any suitable load, such as the gear train of a clock or other mechanism.

Figure 5:
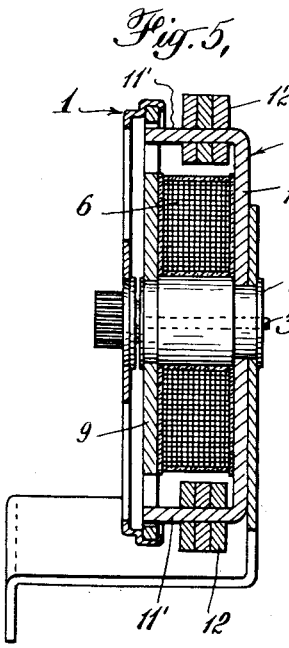
Fig. 5 is a vertical section view of an electric motor representing another embodiment of my invention, this view being taken on line 5—5 of Fig. 6.
Figure 6:
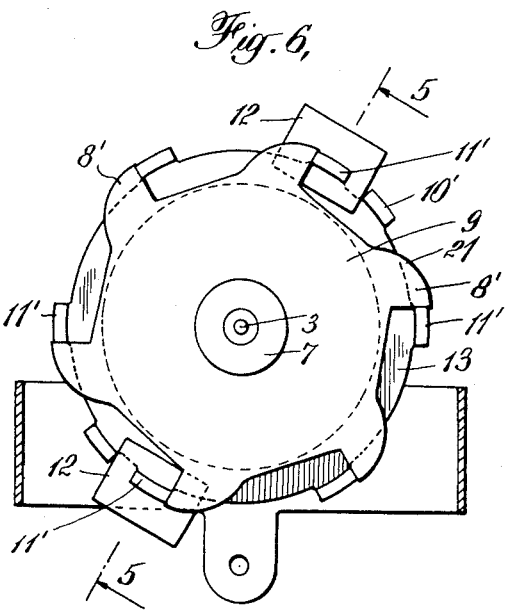
Fig. 6 is an elevation of the motor shown in Fig. 5.

The motor illustrated in Figs. 5 and 6 is similar to the motor shown in Figs. 1 and 2 except for the shape of the pole pieces deriving their flux from the front end of the field winding and except for the number and arrangement of the shaded and unshaded polar projections deriving their flux from the rear end of the field winding. In Figs. 5 and 6 the front disk 9 carries polar projections 8' having leading pole tips substantially in contact with polar projections associated with the rear plate 13, but with their lagging pole tips cut away or rounded off as best shown at 21 to provide a considerable gap between this portion of the pole pieces and the adjacent polar projections of the set of poles associated with the rear plate 13. The polar projections 8' are all equally spaced from each other but it will be noted that the polar projections 10' and 11' are not uniformly spaced from each other. This second set of polar projections 10' and 11' deriving their flux from the rear end of the field winding 6 include unshaded poles 10' and shaded poles 11', the lagging effect being produced by the conducting rings 12 encircling the projections 11'. The two groups of unshaded poles provide what may be characterized as a stationary axis magnetic field effective for maintaining synchronous operation of the motor and the shaded poles provide with the adjacent unshaded poles a rotating magnetic field for imparting a starting torque to the rotor 1 in the manner previously described in connection with Figs. 1 and 2.

Figure 7:
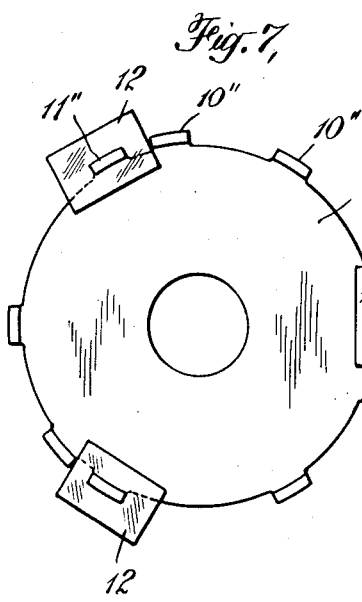
Fig. 7 is an elevation of one section of another embodiment of my invention, this figure representing a portion of the field structure of the motor shown in Fig. 8
Figure 8:
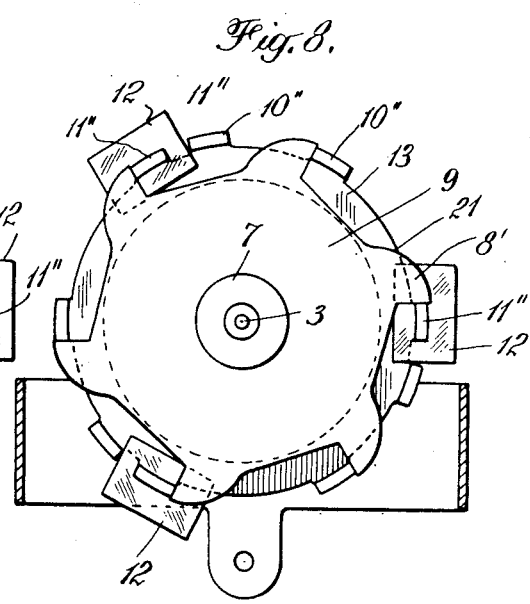
Fig. 8 is an elevation of an electric motor representing another embodiment of my invention.

The motor illustrated in Figs. 7 and 8 is identical with that shown in Figs. 5 and 6 insofar as the front field plate 9 is concerned and accordingly the same reference characters have been applied to similar parts of this part of the apparatus in both figures. In Figs. 7 and 8 the rotor is not illustrated but it will be understood that a rotor such as that shown in Figs. 2, 4 and 5 may be employed. In Fig. 8 the rear disk 13, mounted on the rear end of the central core 7 is provided with unshaded polar projections 10'' and with shaded polar projections 11'', the shading effect being provided by the rings 12. It will be noted that the field structure shown in Figs. 7 and 8 is provided with three shaded poles whereas that shown in Figs. 5 and 6 is provided with only two shaded poles.

The motors illustrated in all figures of the accompanying drawings represent embodiments of my invention in which the two sets of polar projections deriving magnetic flux from the front and rear ends respectively of the magnetizing coil, are disposed in circumferential alignment and shading means for providing a rotating magnetic field are associated with some of the polar projections of only one of these two sets of polar projections. In each instance both sets of polar projections include the same number of unshaded poles but one set includes in addition several polar projections provided with lag means either in the form of individual rings for the polar projections, or in the form of lag plates such as those shown in Fig. 4, which cause the flux in the shaded poles to lag behind the flux in the unshaded poles. My invention in any one of its embodiments provides a compact efficient motor of small dimensions suitable for a variety of uses and it is to be understood that the invention is not limited to the particular forms shown in the accompanying drawings. The various features of my invention may be employed in a variety of ways, not only where it is desirable to provide a number of speed ratios as explained in greater detail in my prior application, Serial Number 684,363 but also where an efficient motor of small dimensions is needed for purposes for which it is unnecessary to provide the multiple speed ratio feature.

I claim:—

1. A single phase electric motor comprising a magnetizable core, a single phase field winding for magnetizing the core, a set of polar projections arranged to derive magnetic flux from one end of said core, a second set of polar projections arranged to derive magnetic flux from the other end of said core, all of said polar projections being circumferentially aligned in a common plane with the polar projections of said first set equally spaced from each other and smaller in number than the polar projections of said second set, and means for causing the flux in some of the polar projections of said second set to lag behind the flux in the other polar projections of said second set.

2. A single phase electric motor comprising a magnetizable core, a single phase field winding for magnetizing the core, a set of polar projections arranged to derive magnetic flux from one end of said core, a second set of polar projections arranged to derive magnetic flux from the other end of said core, all of said polar projections being circumferentially aligned with alternate polar projections of the first set separated by alternate pairs of polar projections of the second set, and means for causing the flux in one polar projection of each of said pairs to lag behind the flux in the other polar projection of said pair.

3. A single phase electric motor comprising a magnetizable core, a single phase field winding for magnetizing the core, a set of polar projections arranged to derive magnetic flux from one end of said core, a second set of polar projections arranged to derive magnetic flux from the other end of said core, all of said polar projections being circumferentially aligned with alternate polar projections of the first set separated by alternate pairs of polar projections of the second set, and means for causing the flux in one polar projection of each of said pairs to lag behind the flux in the other polar projection of said pair, the polar projections of at least one of said sets of pole pieces being equally spaced from each other.

4. A single phase electric motor comprising a magnetizable core, a single phase field winding for magnetizing the core, a set of polar projections arranged to derive magnetic flux from one end of said core, a second set of polar projections arranged to derive magnetic flux from the other end of said core, all of said polar projections being circumferentially aligned with alternate polar projections of the first set separated by alternate pairs of polar projections of the second set, and means for causing the flux in one polar projection of each of said pairs to lag behind the flux in the other polar projection of said pair, the polar projections of each of said sets being equally spaced from each other.

5. A single phase electric motor comprising a magnetizable core, a single phase field winding for magnetizing the core, a set of polar projections arranged to derive magnetic flux from one end of said core, a second set of polar projections arranged to derive magnetic flux from the other end of said core, all of said polar projections being circumferentially aligned with alternate polar projections of the first set separated by alternate pairs of polar projections of the second set, and means for causing the flux in one polar projection of each of said pairs to lag behind the flux in the other polar projection of said pair, the polar projections of said first set of polar projections being equally spaced from each other and the said pairs of polar projections being spaced from each other a distance greater than the distance between the polar projections of each pair.

6. A single phase electric motor comprising a magnetizable core, a single phase field winding for magnetizing the core, a set of polar projections arranged to derive magnetic flux from one end of said core, a second set of polar projections arranged to derive magnetic flux from the other end of said core, all of said polar projections being circumferentially aligned in a common plane with the polar projections of said first set equally spaced from each other and smaller in number than the polar projections of said second set, means for causing the flux in some of the polar projections of said second set to lag behind the flux in the other polar projections of said second set, and a rotor of magnet material and having uniform reluctance in all directions.

7. A single phase electric motor comprising a magnetizable core, a single phase field winding for magnetizing said core, a set of polar projections arranged to derive magnetic flux from one end of said core, a second set of polar projections arranged to derive magnetic flux from the other end of said core, all of said polar projections being circumferentially aligned in a common plane with the polar projections of said first set equally spaced from each other and said second set including pairs of adjacent polar projections with said pairs spaced from each other a distance greater than the distance between the polar projections of each pair, and means for causing the flux in one polar projection of each of said pairs to lag behind the flux in the other polar projections of said pairs.

8. An electric motor comprising a single phase field winding, a set of polar projections arranged to derive magnetic flux from one end of said winding, a second set of polar projections arranged to derive magnetic flux from the other end of said field winding, all of said polar projections being in circumferential alignment, and means for causing the flux in some of the polar projections of only one of said sets to lag behind the flux in the other polar projections thereof.

9. An electric motor comprising a single phase field winding, a set of polar projections arranged to derive magnetic flux from one end of said field winding, a second set of polar projections arranged to derive magnetic flux from the other end of said winding and disposed between and in alignment with the polar projections of the other set, and means for causing the flux in some of the polar projections of only one of said sets to lag behind the flux in the other polar projections thereof.

10. A single phase electric motor comprising a magnetizable core, a single phase field winding for magnetizing the core, a set of polar projections arranged to derive magnetic flux from one end of said core, a second set of polar projections arranged to derive magnetic flux from the other end of said core, all of said polar projections being circumferentially aligned in a common plane with the polar projections of said first set equally spaced from each other and smaller in number than the polar projections of said second set, and with the polar projections of said second set unequally spaced from each other, and means for causing the flux in some of the polar projections in said second set to lag behind the flux in the other polar projections of said second set.

ARTHUR WILLIAM HAYDON.